US008454375B2

(12) United States Patent
Bauer

(10) Patent No.: US 8,454,375 B2
(45) Date of Patent: Jun. 4, 2013

(54) CLOSURE DEVICE FOR AN ELECTRICAL PLUG-IN COUPLING MEANS ARRANGED ON A MOTOR VEHICLE OR A CHARGING STATION

(75) Inventor: Angelika Barbara Maria Bauer, Raubling (DE)

(73) Assignee: Temtec Fahrzeugtechnik Entwicklungsgesellschaft mbH, Raubling (DE)

( * ) Notice: Subject to any disclaimer, the term of this patent is extended or adjusted under 35 U.S.C. 154(b) by 127 days.

(21) Appl. No.: 13/160,981

(22) Filed: Jun. 15, 2011

(65) Prior Publication Data

US 2011/0306223 A1     Dec. 15, 2011

(30) Foreign Application Priority Data

Jun. 15, 2010   (DE) .......................... 10 2010 023 784

(51) Int. Cl.
  *H01R 13/44*   (2006.01)
(52) U.S. Cl.
  USPC .......................................................... 439/135
(58) Field of Classification Search
  USPC .................... 439/133–136, 141–144, 34–35
  See application file for complete search history.

(56) References Cited

U.S. PATENT DOCUMENTS

| 5,382,171 A * | 1/1995 | Hofmann et al. ............. 439/142 |
| 5,478,249 A * | 12/1995 | Crestin ......................... 439/138 |
| 5,934,918 A | 8/1999 | Wuechner |
| 6,287,136 B1 * | 9/2001 | Deutsch ........................ 439/337 |
| 6,609,917 B1 * | 8/2003 | Laurandel et al. ............ 439/135 |

FOREIGN PATENT DOCUMENTS

| DE | 4425838 A1 | 1/1996 |
| DE | 19642687 A1 | 4/1998 |
| DE | 102007002025 A1 | 7/2008 |

OTHER PUBLICATIONS

Office Action in corresponding German patent application 10 2010 023 784.1 (Feb. 10, 2012).

* cited by examiner

*Primary Examiner* — Edwin A. Leon
(74) *Attorney, Agent, or Firm* — Nixon & Vanderhye P.C.

(57) ABSTRACT

A closure device for an electrical plug-in coupling arranged on a motor vehicle or a charging station. A locking arrangement is provided for locking the plug coupled to the plug-in coupling. The locking arrangement can be operated via a gear mechanism between the drive motor and the closure flap. The locking arrangement has a locking element which, when the closure flap is transferred from an intermediate open position, in which the plug can be coupled to the plug-in coupling, into the final open position, can be brought into a locked position which prevents the removal of the plug from the plug-in coupling.

17 Claims, 6 Drawing Sheets

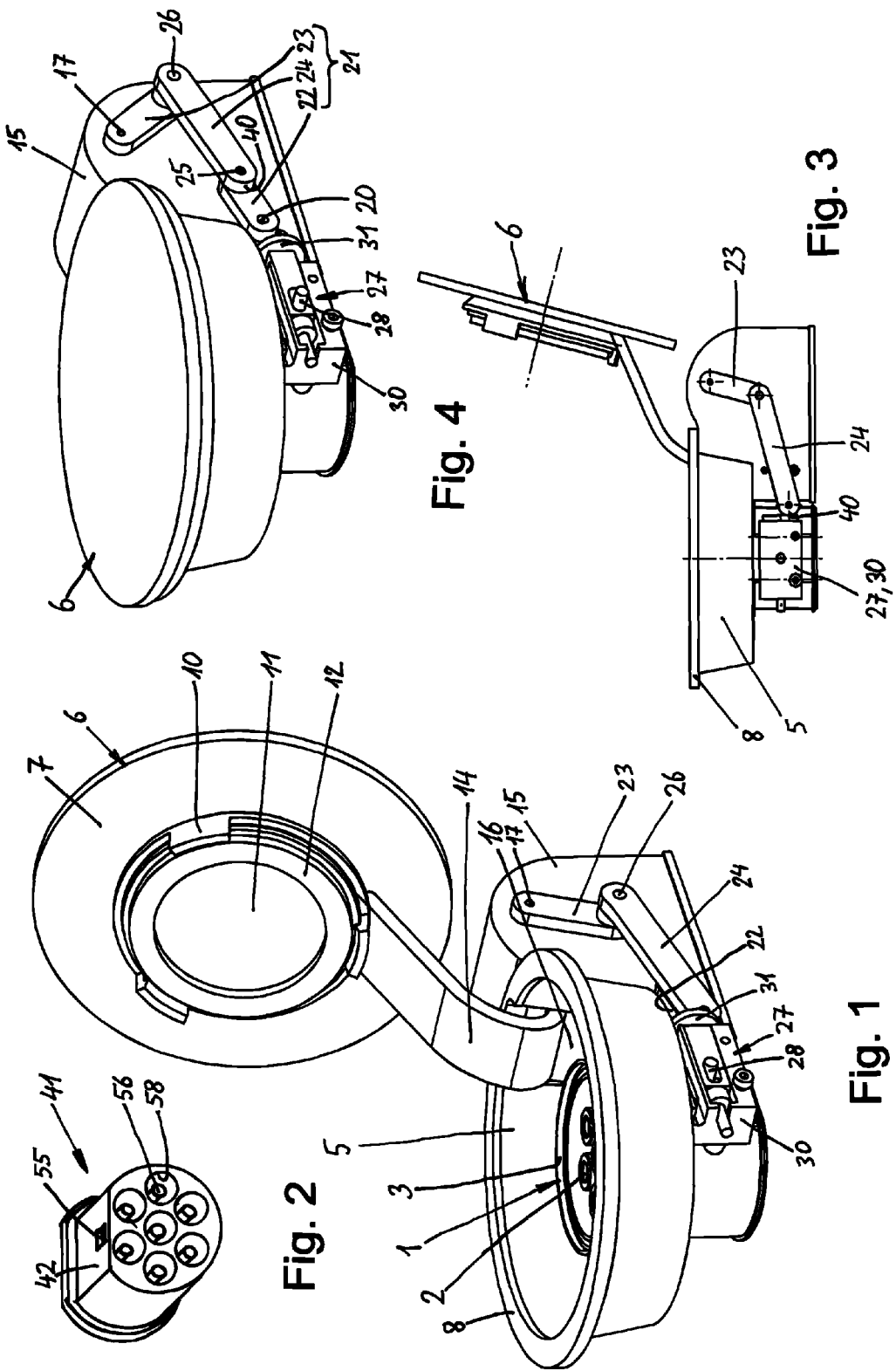

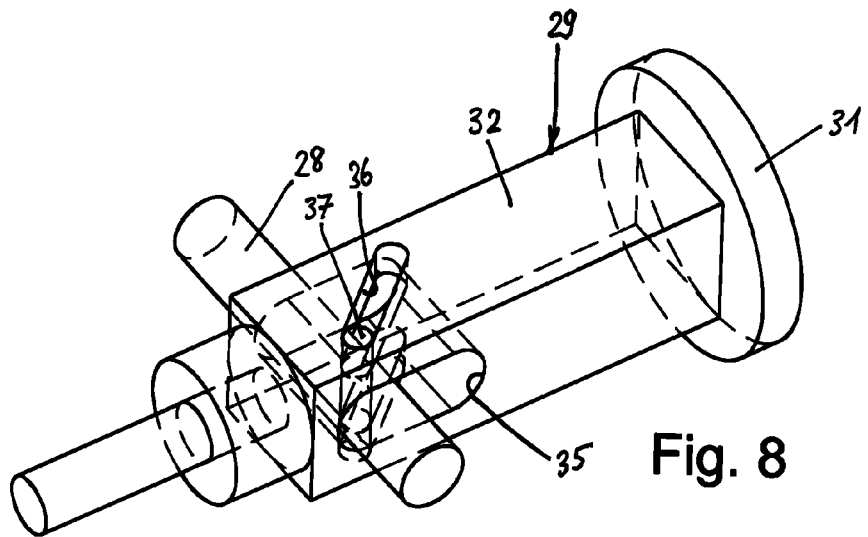
Fig. 8
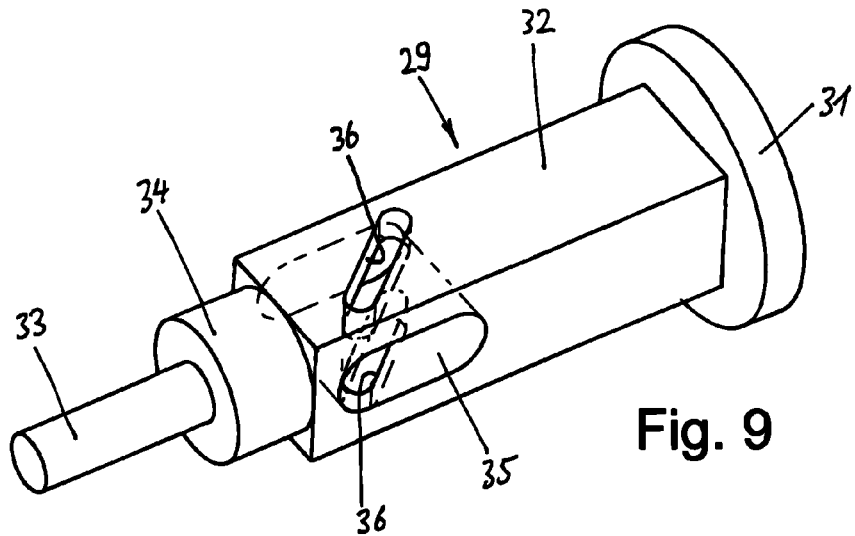
Fig. 9
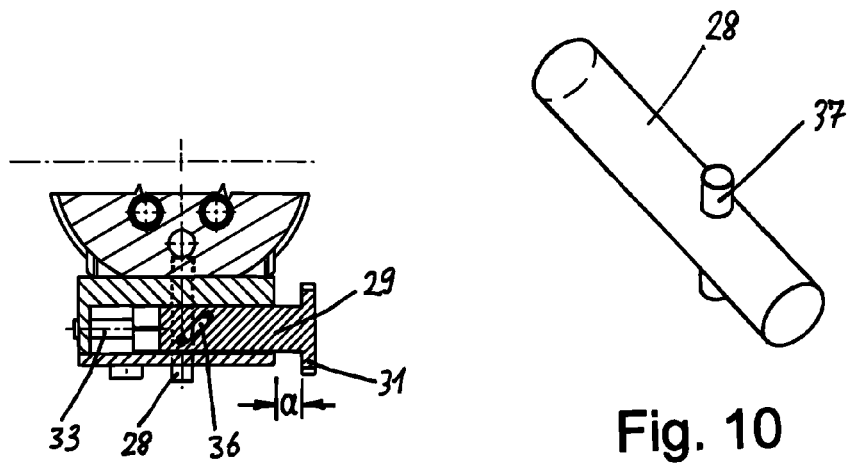
Fig. 11
Fig. 10

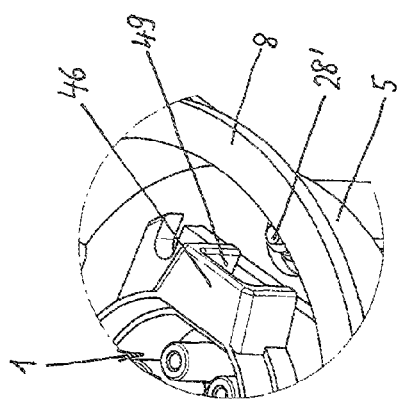
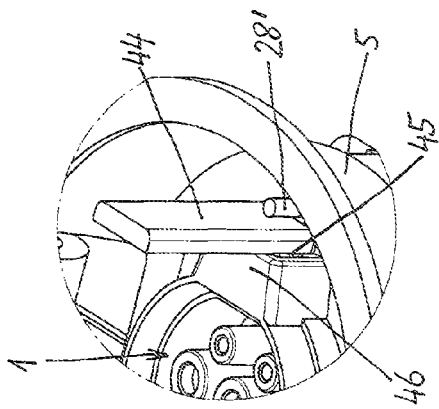
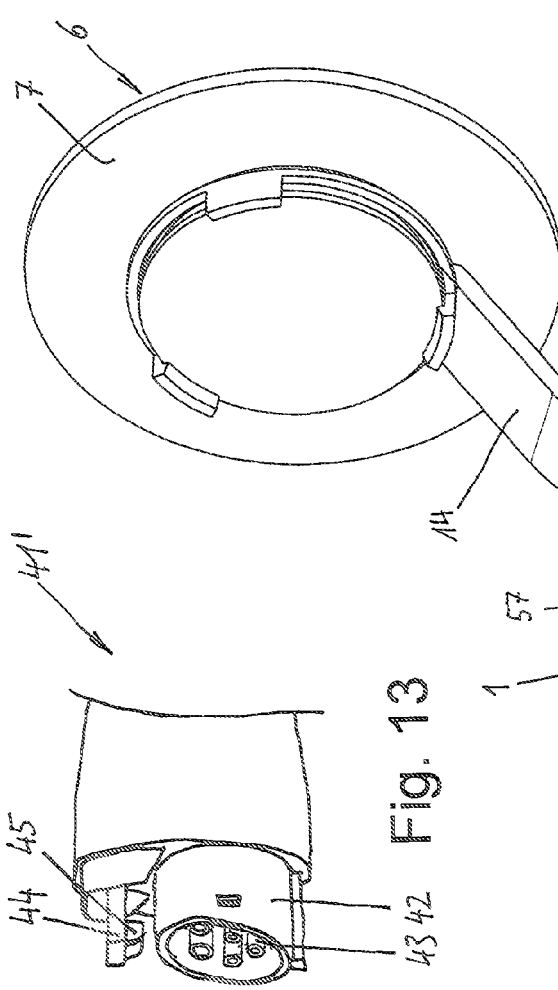
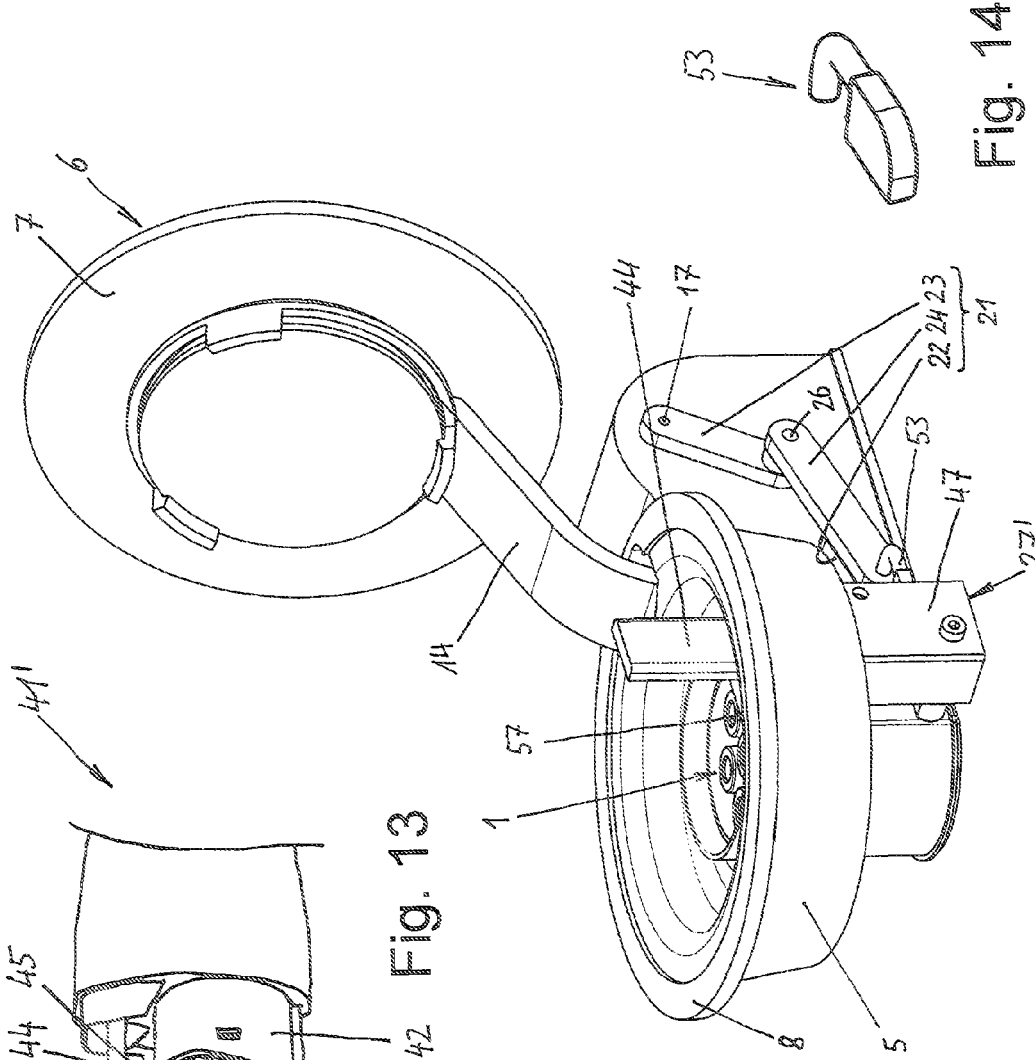
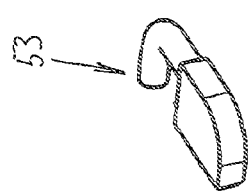

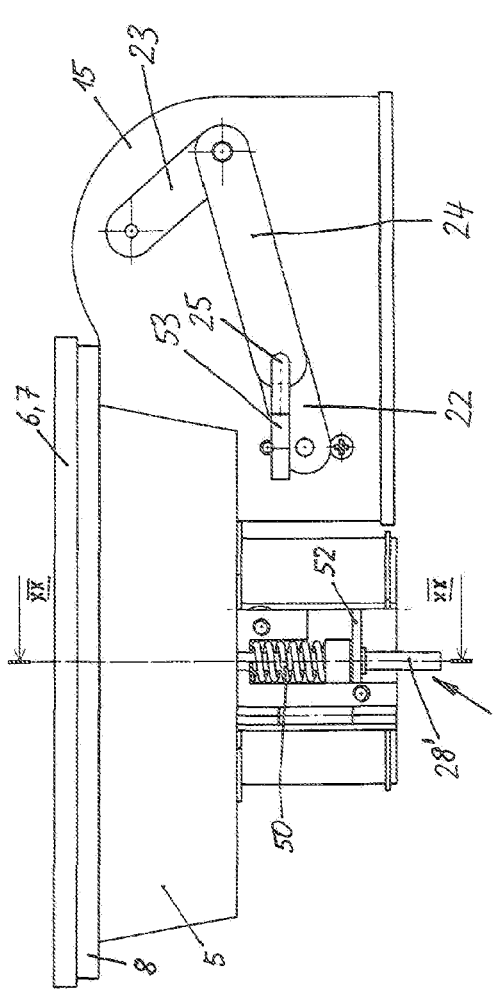
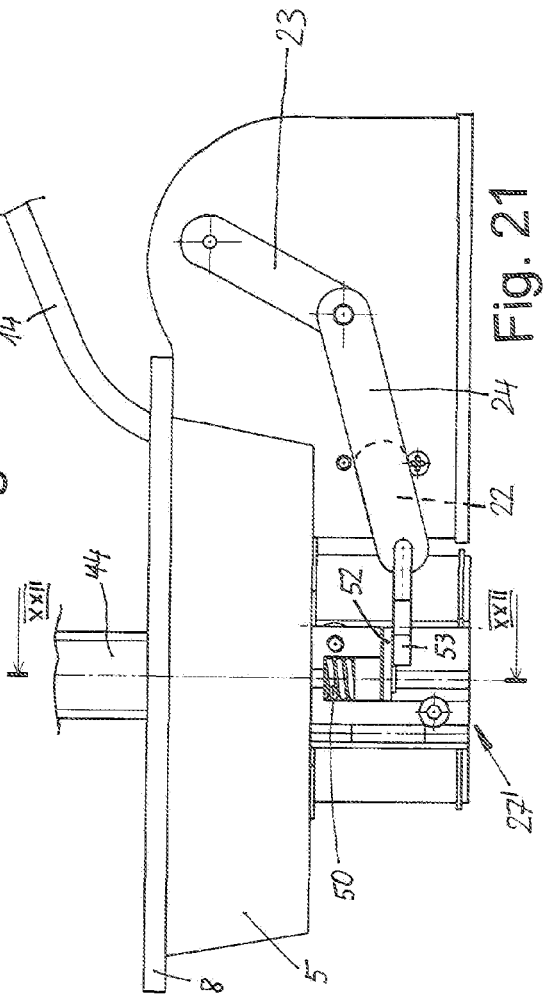
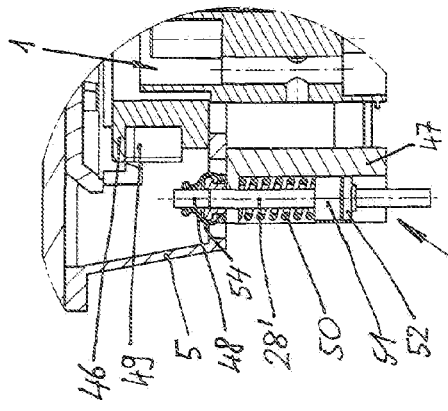
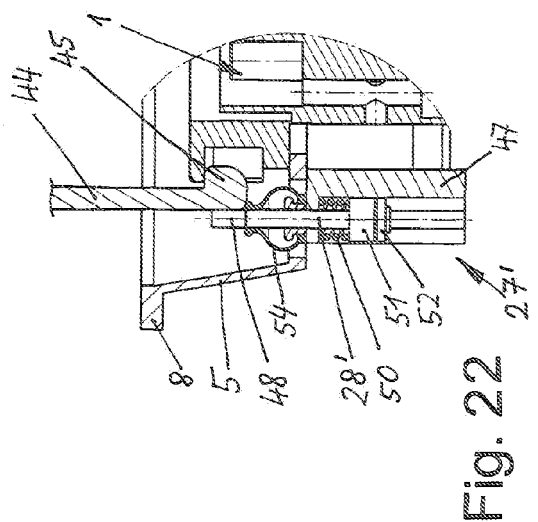

CLOSURE DEVICE FOR AN ELECTRICAL PLUG-IN COUPLING MEANS ARRANGED ON A MOTOR VEHICLE OR A CHARGING STATION

CROSS-REFERENCE TO RELATED APPLICATION

This application claims priority to Germany Application No. 10 2010 023 784.1-34 filed Jun. 15, 2010, the entire contents of which is hereby incorporated by reference.

FIELD

The invention relates to a closure device for an electrical plug-in coupling means, which is arranged on a motor vehicle or a charging station and can be coupled to a plug, according to the preamble of claim 1.

In the field of motor vehicle technology, closure devices are known in the form of tank closures comprising a tank cover which can be moved automatically by means of an electric motor, between a closed position in which the mouth of the fuel filler pipe is closed and an open position, when the electric motor receives a corresponding opening or closing signal.

BACKGROUND AND SUMMARY

It is further known to charge electric cars via electrical charging cables. A charging cable of this type comprises a plug which can be inserted into a plug-in coupling means ("socket") arranged on the motor vehicle. Plugs and sockets of this type are shown in standard sheet VDE-AR-E 2623-2-2, for example. A further plug which can be coupled to a corresponding socket is standardised by SAE J1772. An additional snap-in hook is provided on the plug according to SAE J1772 and engages a holding web of the socket from behind when the plug is inserted and thus prevents the plug from coming loose from the socket in an unintended manner.

Corresponding plug-in couplings can be provided not only between the charging cable and the motor vehicle but also between a charging station and the charging cable.

In general, it is desirable for electrical plug-in coupling means to be tightly sealed by the closure flap when not in use, in order to avoid the penetration of moisture and dirt. Electrical flap drives have particular advantages in this connection, since with purely manual systems relatively high operating forces are required to press the closure flap tightly onto the neck of the plug-in coupling means.

Known closure devices also have the drawback that they cannot, in a simple manner, prevent the charging cable from coming loose from the motor vehicle or from the charging station in an unauthorised manner. This is particularly important when motor vehicles are being charged, since the motor vehicles often remain connected to the charging station for a relatively long period of time, i.e. for many hours, and the driver is generally away from the vehicle during the charging process. Therefore, safety means are desirable which prevent the charging cable from being removed from a vehicle in an unauthorised manner during the charging process and connected to another vehicle.

The object of the invention is to provide a closure device of the type mentioned at the outset which is as simple to operate as possible and which makes it possible to lock a plug inserted into the plug-in coupling means in such a way that an unauthorised removal of the plug is prevented.

This object is achieved by a closure device having the features of claim 1. Advantageous embodiments of the invention are described in the further claims.

In the closure device according to the invention, a locking means is provided for locking the plug coupled to the plug-in coupling means and can be operated via the gear mechanism provided between the drive motor and the closure cap. This locking means comprises a locking element which, when the closure flap is transferred from an intermediate open position, in which the plug can be coupled to the plug-in coupling means, into the open position, can be brought into a locked position which prevents the removal of the plug from the plug-in coupling means.

According to the invention, the movement of the gear mechanism which transfers the rotational movement of the drive motor to the closure flap is thus used, once the plug has been inserted into the plug-in coupling means, to bring a locking element into a position in which the unauthorised removal of the plug from the plug-in coupling means is prevented. In this case, the closure device can be constructed in a very simple and space-saving manner, since only a few additional parts are required for the locking means. In addition, the closure device can be produced cost-effectively and can be operated using a very simple control logic.

According to an advantageous embodiment, the locking element, which is preferably a longitudinally displaceable bolt or pin, is movable between an unlocked position, in which it is located to the side of the insertion region of the plug, and a locked position, in which it engages in a locking manner in a recess of the plug. In particular, an embodiment of this type is suitable for locking a plug according to VDE-AR-E 2623-2-2.

Alternatively, however, the locking element can also be movable between an unlocked position and a locked position in which it is positioned beside a snap-in hook of the plug in such a way that a movement of the snap-in hook into the release position thereof is prevented. In particular, a closure device of this type is suitable for a plug according to SAE J1772.

According to an advantageous embodiment, the gear mechanism between the drive motor and the closure flap comprises a multi-part closure flap drive linkage comprising articulated linkage elements. In addition, the locking element can be moved by means of an operating part which can be displaced by a linkage element or is fastened to a linkage element.

If the operating part consists of a plunger, it is advantageous for the end face of the plunger to be acted on by a linkage element when the closure flap is transferred into the final open position. This makes a particularly simple and space-saving construction possible.

According to an advantageous embodiment, when the closure flap is in the final open position, the linkage elements adopt a position in which rotation thereof is prevented when force is introduced manually via the closure flap. It is thus impossible to push the closure flap back into the intermediate open position in which the plug could be released from the plug-in coupling means.

According to an advantageous embodiment, when the closure flap is in the closed position, the linkage elements adopt a position in which rotation thereof is prevented when force is introduced manually via the closure flap, in such a way that the closure flap cannot be opened.

According to an advantageous embodiment, the drive means for moving the closure flap is coupled to a central locking means of a motor vehicle in such a way that operation of the central locking means causes the drive motor to move the closure flap from the intermediate open position into the final open position and vice versa, and thereby to move the locking element into the locked position or into the unlocked position. Alternatively, however, it is entirely possible to control the movement between the intermediate open position and the final open position of closure flap not via the central locking means, but rather via a switch which is separate therefrom.

BRIEF DESCRIPTION OF THE DRAWINGS

In the following, the invention will be described in greater detail by way of example with reference to the drawings, in which:

FIG. 1 shows a first embodiment of a closure device according to the invention with the closure flap opened, FIG. 2 shows the front end portion of a plug which can be locked using the closure device according to the invention of FIG. 1, FIG. 3 is a side view of the closure device of FIG. 1, FIG. 4 shows the closure device of FIG. 1 with the closure flap closed, FIG. 8 is a three-dimensional view of a plunger and a locking element which can be moved by the plunger, FIG. 9 shows the operating element of FIG. 8 in isolation, FIG. 10 shows the locking element of FIG. 8 in isolation, FIG. 11 is a sectional view along the line XI-XI of FIG. 6, FIG. 12 is a view of a second embodiment of a closure device according to the invention with the closure flap opened, FIG. 13 shows a front portion of a known SAE plug which can be inserted into the closure device of FIG. 12, FIG. 14 is a three-dimensional view of the operating part in the form of a driver in isolation, FIG. 15 is a three-dimensional view of part of the plug-in coupling means of FIG. 12, showing a part of a locked snap-in hook of the plug of FIG. 13 which is engaged with the plug-in coupling means, FIG. 16 is a view according to FIG. 15 without a snap-in hook in the unlocked position of the locking element, FIG. 19 is a side view of the closure device of FIG. 12, with the closure flap closed (without front cover plate), FIG. 20 is a section along the line XX-XX of FIG. 19, FIG. 21 is a side view of the closure device of FIG. 12, with the closure flap in the final open position (without front cover plate), and FIG. 22 is a section along the line XXII-XXII of FIG. 21.

DETAILED DESCRIPTION

Figure 5:
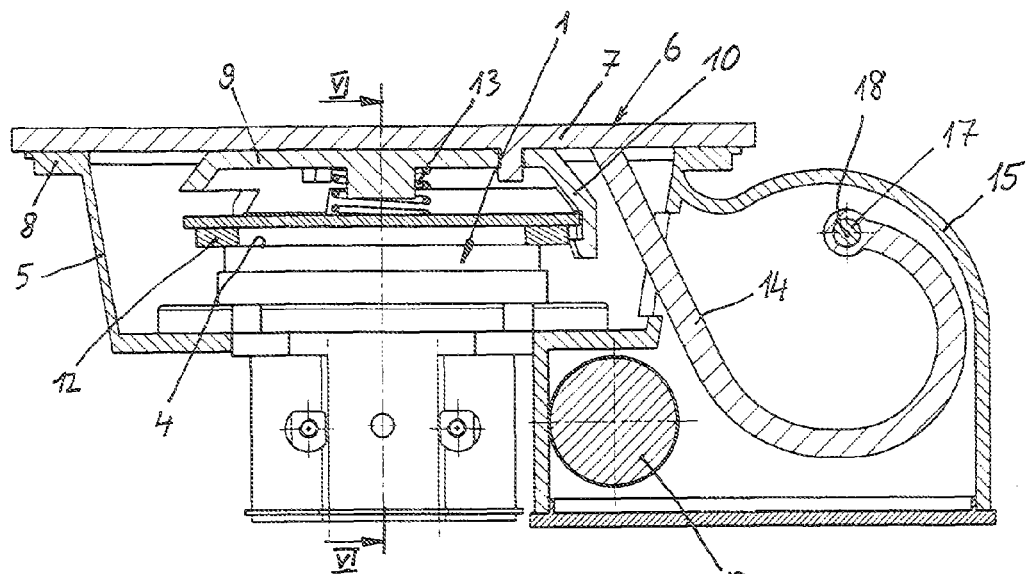
FIG. 5 is a central longitudinal section through the closure device of FIG. 4.

Initially, a first embodiment of the closure device according to the invention will be described with reference to FIGS. 1 to 11.

The closure device is used to close a plug-in coupling means 1 (socket) which for example can be arranged on a motor vehicle or a charging station. A plug 41, the front portion of which is shown in FIG. 2, can be inserted into this plug-in coupling means 1. This plug 41 comprises cylindrical holes 58 with internal contact pins 56. The outer wall of the plug 41 is provided with reference numeral 42. A cavity or recess 55 is located in this wall.

The plug-in coupling means 1 comprises insertion pegs 2 which are inserted into the holes 58 of the plug 41. In the coupled state, contact sleeves which are arranged in the insertion pegs 2 contact the contact pins 56 of the plug 41.

The insertion pegs 2 of the plug-in coupling means 1 are surrounded by a peripheral wall 3 which comprises a mouth 4 in the front end region thereof. The space enclosed by the peripheral wall 3 is used for insertion of the plug 41.

Plug-in coupling means of this type are already known in principle, and so a detailed description will not be given.

The plug-in coupling means 1 is accommodated in a recessed manner in a bowl-shaped receiving cup 5, which for example can be embedded in the chassis of a motor vehicle.

Figure 6:
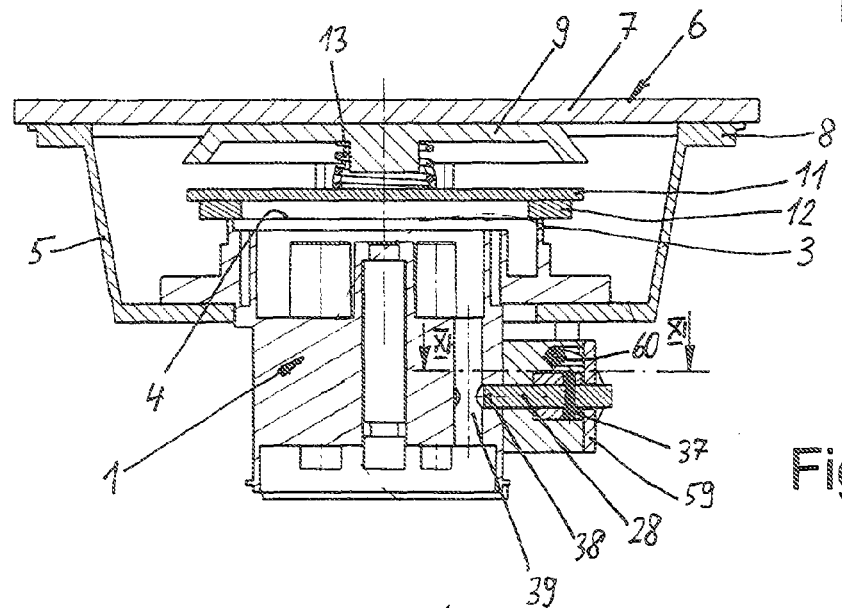
FIG. 6 is a section along the line VI-VI of FIG. 5 with the closure flap in the closed position and the locking element in the unlocked position.

In order to close the mouth 4 of the plug-in coupling means 1 tightly, a closure device comprising a motor-driven closure flap 6 is provided. This closure flap 6 comprises an outer cover plate 7 which can be placed on the outer edge 8 of the receiving cup 5. A holding plate 9 is fastened to the cover plate 7 and comprises peripheral holding fingers 10 which snap into place around and hold a sealing plate 11. With reference to FIGS. 1, 5 and 6, for example, the sealing place 11 comprises a sealing ring 12 which can be placed on the outer edge of the peripheral wall 3 in a sealing manner. A spring 13 between the sealing plate 11 and the holding plate 9 ensures that the sealing ring 12 is always pressed against the end face of the peripheral wall 3 with a particular initial tension.

The closure flap 6 is fastened to a closure flap strap 14 which extends through an opening 16 provided in the receiving cup 5 and into a space enclosed by an adjacent drive housing 15. The end of the closure flap strap 14 is rotationally engaged with a shaft 17. This shaft 17 extends transversely through the drive housing 15 and is rotatably mounted in the two side walls of the drive housing.

It will be appreciated that, when the shaft 17 is rotated clockwise about the rotational axis 18, the closure flap 6 may be pivoted upwards from the closed position shown in FIG. 5, in order to uncover the mouth 4 of the plug-in coupling means 1 and make it possible to insert the plug 41.

The closure flap is pivoted by means of a drive motor 19 which is shown merely schematically in FIG. 5 and is accommodated in the drive housing 15. The drive motor 19 is expediently a slow-speed electric motor which is switched on when a corresponding control signal is received. The drive motor 19 comprises a drive shaft 20 (FIG. 4) which extends outwards through a side wall of the drive housing 15. The rotational movement of the drive shaft 20 is transferred to the shaft 17 of the closure flap strap 14 via a gear mechanism 21 which comprises a first linkage element 22, a second linkage element 23 and a third linkage element 24. The first linkage element 22 is rotationally engaged with the drive shaft 20 of the drive motor 19. The second linkage element 23 is rotationally engaged with the shaft 17 of the closure flap strap 14. The third linkage element 23 is articulated on the one hand to the first linkage element 22 via a swivel joint 25 and on the other hand to the second linkage element 23 via a further swivel joint 26. The rotational axes of the drive shaft 20, the swivel joints 25, 26 and the shaft 17 are mutually parallel. All the linkage elements 22, 23, 24 can be arranged close beside the side wall of the drive housing 15, in such a way that the gear mechanism 21 requires only a small installation space.

If the drive shaft 20 is rotated clockwise from the position shown in FIG. 4, the first linkage element 22 is also pivoted clockwise accordingly, which causes the second linkage element 23 to be pivoted in the same direction via the third linkage element 24, and thus the shaft 17 to rotate clockwise, as a result of which the closure flap 6 is opened.

The closure flap 6 is opened in two steps. If the closure flap 6 is closed and the drive motor 19 receives a control signal to open the closure flap 6, the closure flap 6 is initially pivoted upwards into an intermediate open position. In this intermediate open position the closure flap 6 is still not fully open, but is open far enough that the plug 41 can be inserted into the plug-in coupling means 1. If the closure flap 6 reaches the intermediate open position, the drive motor 19 initially switches off. The drive motor 19 only moves the closure flap 6 further into the final open position thereof when it receives a further opening signal. This movement from the intermediate open position into the final open position is utilised to lock the inserted plug to the plug-in coupling means 1 using a locking means 27, as will be explained in further detail in the following.

With particular reference to FIGS. 8 to 11, the locking means 27 comprises a pin- or bolt-shaped locking element 28 and a plunger 29 for moving the locking element 28. The locking element 28 extends radially outwards from the plug-in coupling means 1 and at right angles to the plunger 29. In addition, the locking element 28 and plunger 29 are each longitudinally displaceably guided in a plunger housing 30 which is located directly beside the peripheral wall 3 of the plug-in coupling means 1 below the receiving cup 5. FIGS. 1 and 4 each show the plunger housing 30 without an outer cover plate 59 (FIG. 6, 7).

The plunger 29 comprises a plunger head 31, a cuboid-shaped plunger portion 32 and a cylindrical guide pin 33 to which a magnet 34 is fastened.

With reference to FIGS. 8 and 9, a transversely extending elongate recess 35, through which the locking element 28 extends, is provided in the cuboid-shaped plunger portion 31. In addition, oblique recesses 36 in the form of obliquely extending elongate holes are provided in the regions of the plunger portion 32 which are located above and below the elongate recess 35. A slide pin 37 of the locking element 28 extends into these oblique recesses 36. With reference to FIG. 9, this slide pin 37 projects past the residual contour of the locking element 28 on both sides. The oblique recesses 36 thus represent sliding guides for the slide pin 37 and cause the locking element 28 to be displaced in the longitudinal direction thereof, i.e. at right angles to the longitudinal direction of the plunger 29, when the plunger 29 is displaced in the longitudinal direction thereof, while the locking element 28 cannot move in the longitudinal direction of the plunger 29, but only at right angles thereto.

Figure 7:
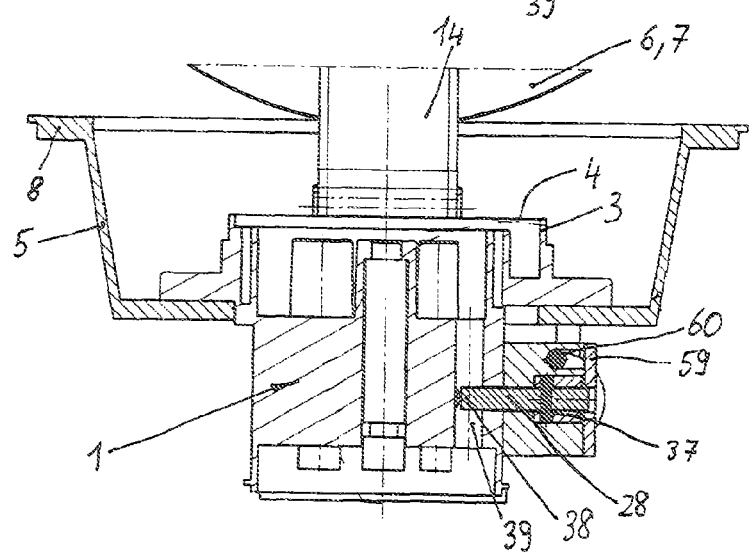
FIG. 7 is a sectional view according to FIG. 6 with the closure flap in the final open position and the locking element in the locked position.
Figure 17:
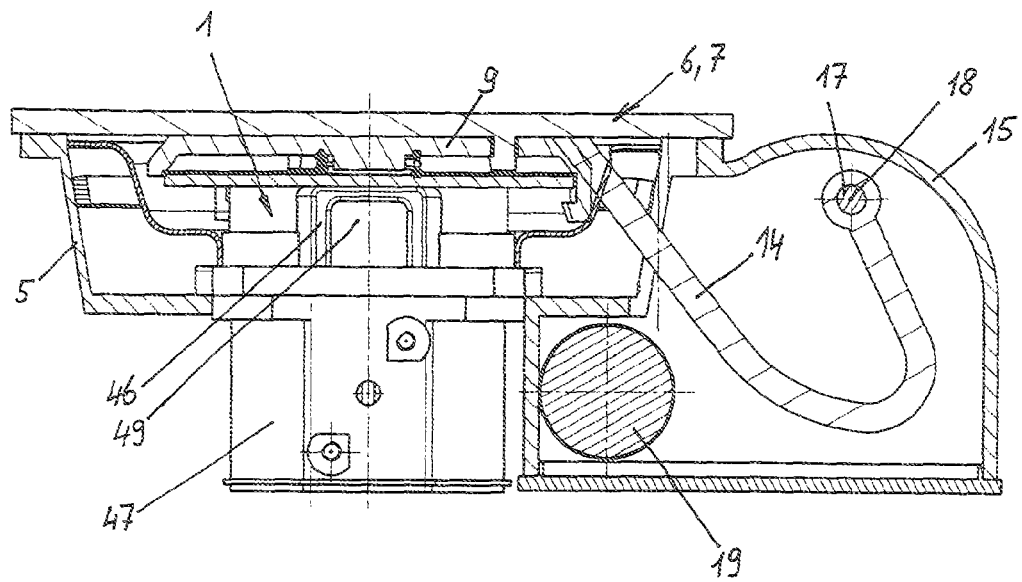
FIG. 17 is a vertical longitudinal section through the closure device of FIG. 12 with the closure flap closed.
Figure 18:
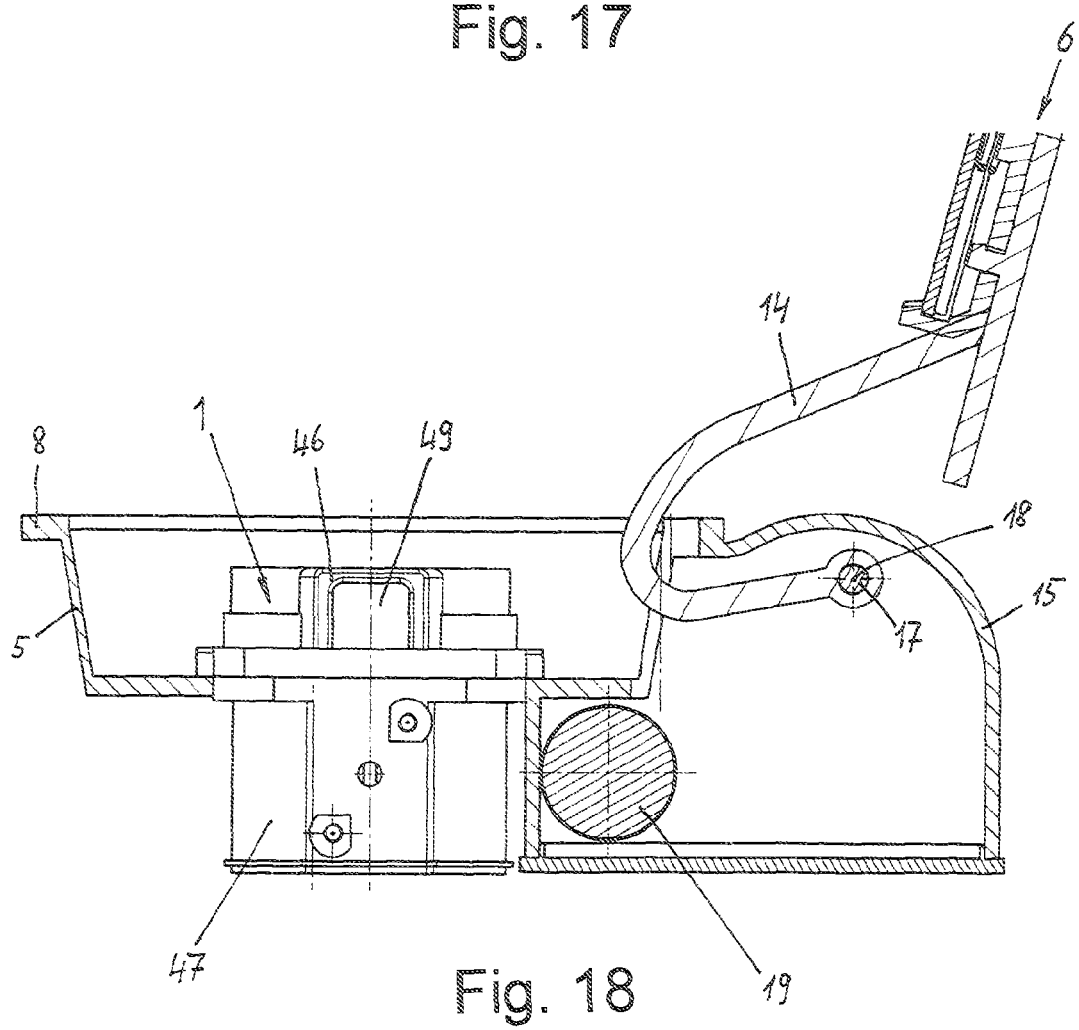
FIG. 18 is a view according to FIG. 17, with the closure flap in the final open position.

These kinematics between the plunger 29 and the locking element 28 arranged crossways in relation thereto are used to move the locking element 28 between an unlocked position which is shown in FIG. 6 and a locked position which is shown in FIG. 7. In the unlocked position, the inner end 38 of the locking element 28 is located outside an insertion region 39, provided in the plug-in coupling means 1, for the wall 42 of the plug 41. By contrast, if the locking element 28 is displaced inwards by means of the plunger 29, the inner end 38 of the locking element 28 extends into this insertion region 39, as can be seen from FIG. 7, the locking element 28 extending into the recess 55 in the wall 42 of the plug 41 and thereby locking the plug 41 in such a way that it is no longer possible to pull the plug out of the plug-in coupling means 1. It will be appreciated that, for reasons of clarity, the inserted plug is not shown in FIG. 7.

The plunger 29 and thus the locking element 28 are moved from the unlocked position into the locked position by means of the gear mechanism 21. Between the closed position shown in FIG. 4 and the intermediate open position of the closure flap 6, the linkage elements 22-24 are located in a position with spacing from the plunger head 31. In this case, the plunger 39 is pushed to the right by means of a spring (not shown), the plunger 29 extending somewhat out of the plunger housing and the plunger head 31 being located at a distance a from the end face of the plunger housing 30, as can be seen from FIG. 11. In addition, as can be seen from FIG. 4, when the closure flap 6 is in the closed position the first linkage element 22 extends parallel to the third linkage element 24. This has the effect that the closure flap 6 can only be opened via the drive motor 19, and not by lifting the closure flap 6 manually. In the closed position, a safety means against unintentional manual opening of the closure flap 6 is thus provided solely by the kinematic arrangement of the linkage elements 22, 24.

If the closure flap 6 is opened by means of the drive motor 19, the front end 40 of the third linkage element 24 and/or the end adjacent thereto of the first linkage element 22 come(s) into contact with the plunger head 31 from a particular angle of rotation of the first linkage element 22 onwards. Shortly after this contact, the drive motor 19 is switched off. In this case, the closure flap 6 is located in the intermediate open position thereof in which the plug 41 can be inserted into the plug-in coupling means 1.

Once, when the closure flap 6 is in the intermediate open position, the plug has been inserted into the plug-in coupling means 1, a further control signal can, if necessary, be supplied to the drive motor 19 in order to pivot the closure flap 6 further into the final open position shown in FIGS. 1, 3 and 7. From the intermediate open position onwards, the locking element 28 enters the insertion region 39 and thus the recess in the wall of the inserted plug. With particular reference to FIG. 3, in this position the front end 40 of the linkage element 24 and/or the end adjacent thereto of the linkage element 22 arranged to the rear push(es) the plunger 29 as far as possible into the plunger housing 30, as a result of which the locking element 28 is displaced inwards as far as possible via the sliding guide.

When the closure flap 6 is in the final open position, the first linkage element 22 again extends parallel to the third linkage element 24. Thus, in the final open position, too, the closure flap 6 can no longer be pivoted back manually into the intermediate open position by applying a compressive force to the closure flap 6, since the kinematics between the linkage elements 22, 24 prevent these linkage elements from rotating when a force is introduced in this direction. It is thus impossible to unlock the plug from the outside.

In order for it still to be possible to open the closure flap 6 or move it back from the final open position in the closure direction in the event of failure of the drive motor 19, an emergency operating means can be provided which can be used to pivot the linkage elements 22, 24 out of the anti-rotation position thereof from the interior of the motor vehicle using a mechanical means. An emergency operating means of this type can, for example, comprise a Bowden cable which acts on the first linkage element 22 or the third linkage element 24 and with which these linkage elements can be pulled out of the anti-rotation position thereof.

The position of the closure flap 6 can be detected for example by means of a magnet 34 (FIG. 9) which is placed on the guide pin 33 of the plunger 29 and cooperates with a reed switch 60 (FIG. 6, 7) which is arranged in the plunger housing 30. Alternatively, it is also possible for the position of the closure flap 6 to be detected by means of an encoder provided in the region of the drive motor 19.

A second embodiment of the closure device according to the invention will be described in the following with reference to FIGS. 12 to 22. Parts of the second embodiment which are identical or similar to those of the first embodiment are provided with like reference numerals, with an additional dash where necessary.

The second embodiment is used for a plug-in coupling means 1 into which a plug 41', the front end portion of which is shown in FIG. 13, can be inserted. Plugs 41' and plug-in coupling means 1 of this type are defined by the standard SAE J1772. The plug 41' comprises a sleeve-shaped wall 42 which encloses hollow cylindrical insertion pegs 43 with internal contact sleeves. The insertion pegs 43 of the plug 41' are inserted into insertion openings 57, in which contact pins are located, of the plug-in coupling means 1.

The plug 41' further comprises, outside the wall 42, an additional snap-in hook 44 comprising a hook element 45 which cooperates in a locking manner with a hook retaining element 46 (FIG. 16) of the plug-in coupling means 1 when the plug 41' is inserted. FIGS. 13 and 16 merely show the end portion of the snap-in hook 44 and for reasons of clarity the remaining parts of the inserted plug 41' are not shown. The manner in which the hook element 45 of the snap-in hook 44 engages in the hook retaining element 46 can be seen from FIG. 15.

In the second embodiment the closure flap 6 is opened and closed, as in the first embodiment, via a drive motor 19 (FIG. 17, 18), the rotational movement of which is rotationally connected to the shaft 17 of the closure flap strap 14 via a first linkage element 22, second linkage element 23 and third linkage element 24. With regard to the mode of operation of the linkage elements 22-24, reference is made to the corresponding description in connection with the first embodiment.

In the second embodiment, too, the opening and closing process of the closure flap 6 is carried out in two steps in each case. The drive motor 19 again opens the initially closed closure flap 6 up to an intermediate open position in which the plug 41' can be inserted into the plug-in coupling means 1. The drive motor 19 switches off automatically when the intermediate open position is reached. The plug 41' can be inserted. If the drive motor 19 subsequently receives, for example through operation of the central locking of a motor vehicle, a signal to open the closure flap 6 further, the closure flap 6 is accordingly opened further by the drive motor 6, the plug 41' simultaneously being locked in such a way that it can no longer be removed from the plug-in coupling means 1.

If, after completion of the charging process, the closure flap 6 is pivoted back into the intermediate open position by means of the drive motor 19, the plug 41' is again unlocked and the drive motor 19 switched off in such a way that the plug 41' can be removed from the plug-in coupling means 1. Once the plug 41 has been removed, the drive motor 19 can for example be started again from the vehicle interior via a special switch, in order to close the closure flap 6 completely.

The second embodiment differs from the first embodiment in terms of the locking means 27' with which the inserted plug 41' is locked between the intermediate open position and the final open position of the closure flap 6. As will be described in further detail in the following, the locking element 27' acts in such a way that the snap-in hook 44, which to release the plug 41' must manually be pushed away from the wall 42 and thus out of engagement with the hook retaining element 46 of the plug-in coupling means 1 by means of a push-button (not shown), is prevented from pivoting outwards into its unlocked position by the locking means 27'.

For this purpose, the locking means 27' comprises a locking element 28' in the form of a locking pin, which can be seen in FIG. 15, 19-22. The locking element 28' is arranged in a longitudinally displaceable manner parallel to the longitudinal axis of the plug-in coupling means 1 and inside a locking housing 47.

With reference to FIGS. 20 and 22, the locking element 28' extends through the base of the receiving cup 5. In the lowered unlocked position which is shown in FIG. 20, the upper end region 48 of the locking element 28' is located so far below the insertion region 49 of the hook retaining element 46 that the hook element 45 of the snap-in hook 44 is not prevented from being moved past the hook retaining element 46 and into the insertion region 49. If, by contrast, the plug 41' is to be locked, i.e. if the snap-in hook 44 is to be secured against release, the locking element 28' is displaced so far upwards by means of the gear mechanism 21 that the upper end region of the locking element 28' overlaps the outer face of the snap-in hook 44, as shown in FIG. 22. The snap-in hook can therefore no longer be moved laterally outwards.

The locking element 28' is biased into the lowered unlocked position thereof by means of a spring 50. The spring 50 surrounds the locking element 28 and is supported by its upper spring end on the locking housing 47 and by its lower spring end on a collar 51 of the locking element 28'. The collar 51 can be a magnet which cooperates with a reed switch associated with a locking housing 47 in order to detect the position of the closure flap. In addition, a driver arm 52 which projects laterally towards the linkage elements 22-24 is fastened to the locking element 28'.

In order to raise the locking element 28' against the pretensioning force of the spring 50, a driver 53 which is shown in isolation in FIG. 13 is fastened to the linkage element 24. This driver 53 extends towards the locking element 28' from the region of the linkage element 24 in which the swivel joint 25 is located.

If the closure flap 6 is in the closed position which is shown in FIG. 19, the driver 53 is spaced apart from the driver arm 52 of the locking element 28. If the closure flap 6 is pivoted into the intermediate open position by the drive motor 19, the driver 53 gradually approaches the driver arm 52 and ultimately engages it from below. If the closure flap 6 is subsequently pivoted further from the intermediate open position into the final open position, the driver 53 is lifted via the linkage element 24, as a result of which the driver arm 52 and thus the locking element 28' are also displaced upwards into the locked position which is shown in FIG. 21, 22.

If the closure flap 6 located in the final open position is closed again by means of the drive motor 19, the linkage elements 22-23 move in the reverse direction, in such a way that the driver 53 is lowered and the locking element 28' is guided back into the lowered unlocked position by the pretensioning force of the spring 50.

In this embodiment, too, the position of the closure flap 6 can again be detected by an encoder provided in the region of the drive motor 19.

In addition, FIGS. 20 and 22 show a seal 54 which seals the passage of the locking element 28' through the base of the receiving cup 5.

In the second embodiment, the linkage elements 22-24 are formed and arranged in the same manner as in the first embodiment, in such a way that the closed closure flap 6 cannot be opened from the outside by pulling on the closure flap 6 and that, when in the final open position, the closure flap 6 cannot be moved in the closure direction from the outside by pushing or pulling the closure flap 6. This is because in the closed position, as shown in FIG. 19, the linkage elements 22, 24 are arranged in a parallel, completely straight position, whereas in the final open position the two linkage elements 22, 24 are arranged in a parallel, side-by-side position.

In the second embodiment, too, an emergency operating means can again be provided, for example a Bowden cable with which the linkage elements 22-24 can be moved mechanically in the event of failure of the drive motor.

According to the invention, the following functions can thus be provided using only a drive motor, the described gear mechanism (linkage elements 22-24) and the purely mechanical locking means 27, 27':
- unlock the closure flap
- open the closure flap
- plug and closure flap locking when the closure flap is open with function detection
- plug and closure flap unlocking with function detection
- close the closure flap
- lock the closure flap.

The control logic can be configured in a very simple manner. Costs and space requirements are low.

The invention claimed is:

1. Closure device for an electrical plug-in coupling means which is arranged on a motor vehicle or a charging station, can be coupled to a plug and comprises a mouth, the closure device comprising:
a closure flap which can be used to close the mouth of the plug-in coupling means and/or an insertion space, surrounding the mouth, for the plug,
a drive means for moving the closure flap between a closed position and a final open position, the drive means comprising a drive motor and a gear mechanism between the drive motor and the closure flap,
for locking the plug coupled to the plug-in coupling means, a locking means is provided which can be operated via the gear mechanism and comprises a locking element which, when the closure flap is transferred from an intermediate open position, in which the plug can be coupled to the plug-in coupling means, into the final open position, can be brought into a locked position which prevents the removal of the plug from the plug-in coupling means.

2. Closure device according to claim 1, wherein the locking element is movable between an unlocked position, in which it is located to the side of the insertion region of the plug, and a locked position, in which it engages in a locking manner in a recess of the plug.

3. Closure device according to claim 1, wherein the locking element is movable between an unlocked position and a locked position in which it is positioned beside a snap-in hook of the plug in such a way that a movement of the snap-in hook into the release position thereof is prevented.

4. Closure device according to claim 1 wherein the gear mechanism between the drive motor and the closure flap comprises a multi-part closure flap drive linkage comprising articulated linkage elements and in that the locking element can be moved by means of an operating part which can be displaced by a linkage element or is fastened to a linkage element.

5. Closure device according to claim 4, wherein the operating part controls the movement of the locking element by means of a sliding guide.

6. Closure device according to claim 4, wherein the operating part consists of a longitudinally displaceable plunger arranged beside the plug-in coupling means.

7. Closure device according to claim 6, wherein the locking element consists of a locking pin which is arranged at right angles to the plunger and comprises a projecting slide pin which is displaceably guided in an oblique recess of the plunger.

8. Closure device according to claim 6, wherein the plunger is arranged beside the plug-in coupling means so as to be longitudinally displaceable in a direction at right angles to the drive shaft of the drive motor.

9. Closure device according to claim 6, wherein the end face of the plunger is acted on by a linkage element when the closure flap is transferred into the final open position.

10. Closure device according to claim 4, wherein the operating part consists of a driver which is fastened to a linkage element and drives the locking element into the locked position when the closure flap is transferred into the final open position.

11. Closure device according to claim 4, wherein when the closure flap is in the final open position, the linkage elements adopt a position in which rotation thereof is prevented when force is introduced manually via the closure flap, in such a way that the closure flap cannot be guided back into the intermediate open position.

12. Closure device according to claim 4, wherein when the closure flap is in the closed position, the linkage elements adopt a position in which rotation thereof is prevented when force is introduced manually via the closure flap, in such a way that the closure flap cannot be opened.

13. Closure device according to claim 1, wherein the gear mechanism comprises a first linkage element, which is rotationally engaged with a drive shaft of the drive motor, and a second linkage element, which is rotationally engaged with a shaft of the closure flap and can be driven by means of the first linkage element.

14. Closure device according to claim 13, characterised in that the gear mechanism comprises a third linkage element which is articulated on the one hand to the first linkage element and on the other hand to the second linkage element.

15. Closure device according to claim 1, wherein the drive means for moving the closure flap is coupled to a central locking means of a motor vehicle in such a way that operation of the central locking means causes the drive motor to move the closure flap from the intermediate open position into the final open position and vice versa, and thereby to move the locking means into the locked position or into the unlocked position.

16. Closure device according to claim 1, wherein a manually operable emergency operating means is provided with which the gear mechanism between the drive motor and the closure flap can be moved in the event of failure of the drive motor.

17. Closure device according to claim 16, wherein the emergency operating means comprises a Bowden cable which acts on a linkage element of the gear mechanism.

* * * * *